United States Patent [19]  
Fay

[11] 4,024,932  
[45] May 24, 1977

[54] DUAL DISPLACEMENT DISC BRAKE CALIPER ASSEMBLY

[76] Inventor: Clarence C. Fay, 17211 Edgewater Drive, Lakewood, Ohio 44107

[22] Filed: June 4, 1976

[21] Appl. No.: 693,096

[52] U.S. Cl. .......................... 188/106 P; 188/345; 188/370
[51] Int. Cl.² ...................................... F16D 55/224
[58] Field of Search ............ 188/72.4, 106 P, 345, 188/370; 92/59, 128

[56] References Cited

UNITED STATES PATENTS

| | | |
|---|---|---|
| 2,951,560 | 9/1960 | Smellie .......................... 188/370 X |
| 3,472,344 | 10/1969 | Bruin et al. ........................ 188/370 |
| 3,517,782 | 6/1970 | Hayes ................................. 188/345 |
| 3,605,569 | 9/1971 | Sessody .................................. 92/59 |
| 3,667,576 | 6/1972 | Irie et al. .................... 188/106 P X |
| 3,724,616 | 4/1973 | Buruett .............................. 188/345 |
| 3,789,961 | 2/1974 | Warwick ........................... 188/345 |
| 3,868,001 | 2/1975 | Yokoi ................................ 188/345 |

Primary Examiner—Trygve M. Blix  
Assistant Examiner—Edward R. Kazenske

[57] ABSTRACT

There is provided an improved disc brake caliper assembly characterized by a caliper body having first and second legs and a member joining them, and having a cylindrical bore extending through one of the legs and dimensioned to receive a cup-shape piston having a head portion and a piston skirt. A flanged second piston relatively movable in the cup-shaped piston is provided with an intermediate shoulder dimensioned to fit into said cylindrical bore and form therewith an annular chamber in which the skirt of the cup-shaped piston moves. A first fluid chamber is formed between the head of the second piston member and the inside closed end of the cup-shaped piston. A second isolated annular chamber is formed between the open end of the piston skirt and the shoulder. The flanged portion of the second piston member is secured by suitable fastening members to a flange receiving surface on the first leg. Fabrication of such a device is simplified, easier to machine and to assemble.

7 Claims, 3 Drawing Figures

U.S. Patent
May 24, 1977
4,024,932
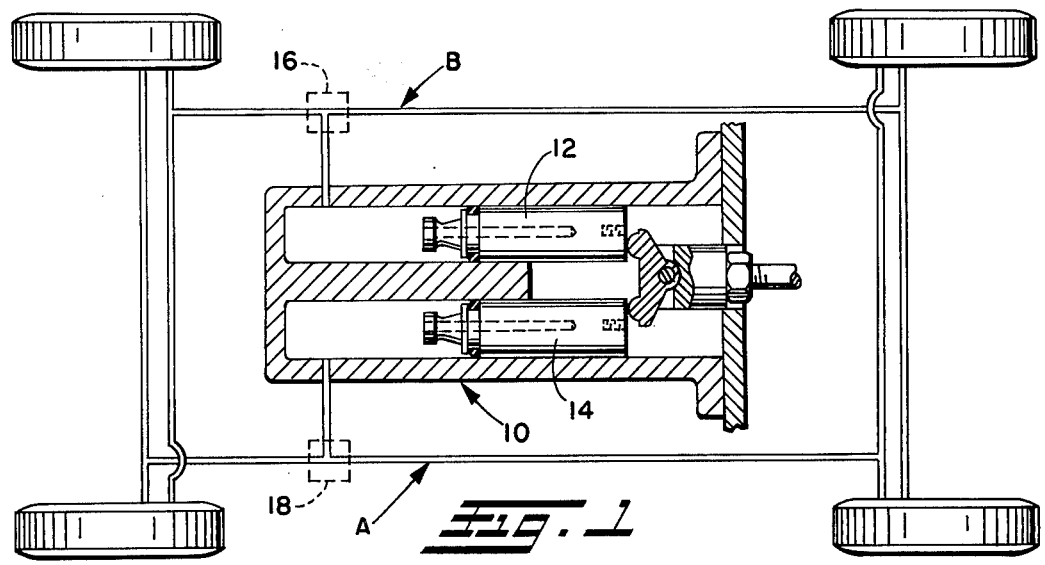
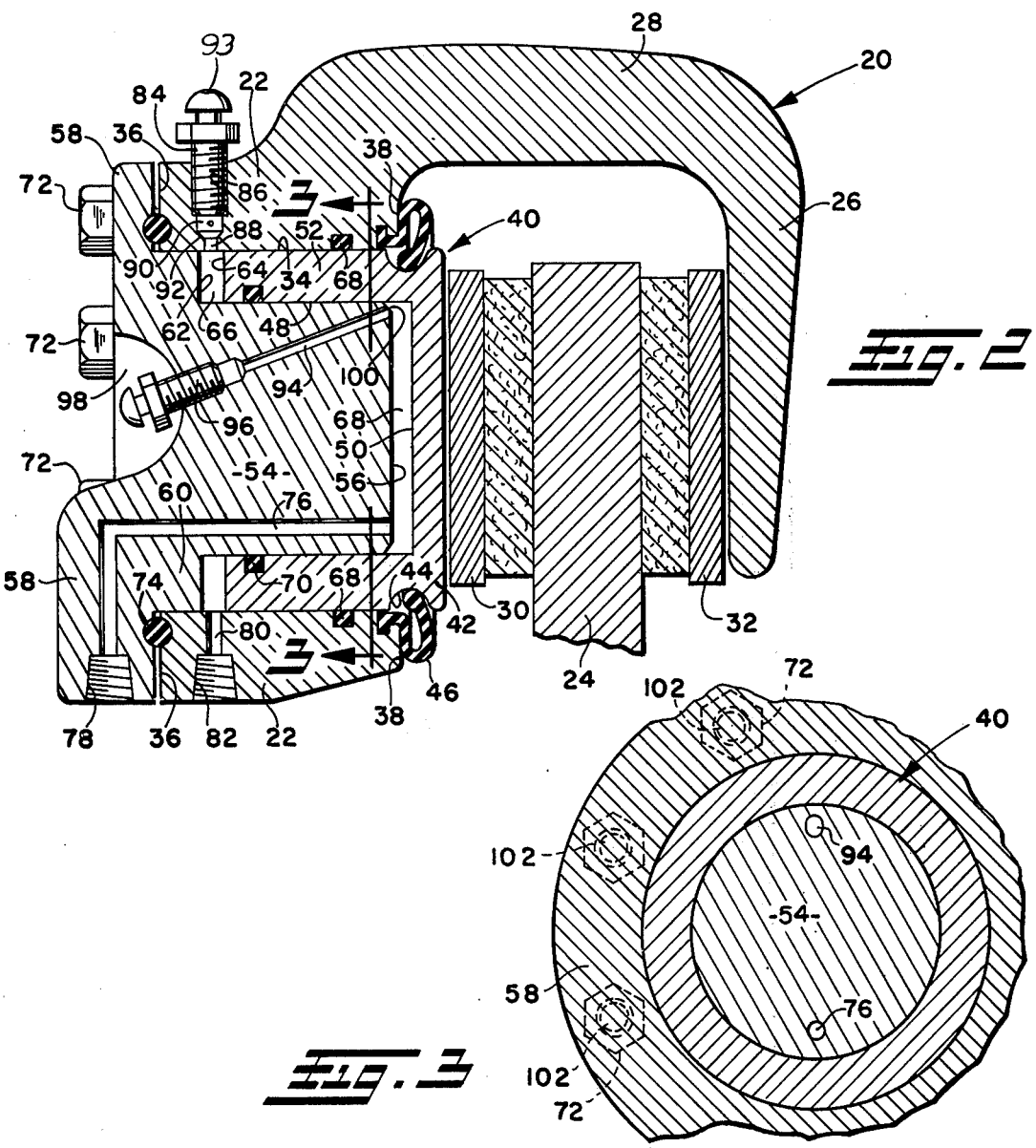

DUAL DISPLACEMENT DISC BRAKE CALIPER ASSEMBLY

BACKGROUND OF THE INVENTION AND PRIOR ART

The present invention is an improvement on structures of the type shown in U.S. Pat. No. 3,517,782 to E. J. Hayes, and U.S. Pat. No. 3,789,961 to Warwick dated Feb. 5, 1974.

For sometime now, automative vehicles have been provided with a dual hydraulic 2+2 braking system. In such system there is provided a master cylinder having two fluid pressurizing chambers operable from a single foot pedal. Each of the fluid pressurizing chambers supplies hydraulic brake fluid under pressure to separate hydraulic sub-systems. Currently, one of the sub-systems has communicated with the wheel cylinders of the two front wheel brakes, and the second of the hydraulic fluid sub-systems has communicated with the two wheel cylinders of the rear wheel brakes. Thus, if one of the hydraulic sub-systems does fail, the vehicle would still have an intact hydraulic sub-system for operating the remaining front or rear brakes only.

It has been found that the major portion of the braking of an automotive vehicle is accomplished by the front wheel brakes. Thus, from 60% to 70% of the braking effort is handled by the front wheel brakes, and the balance by the rear brakes.

To accommodate this difference due to an apparent weight shift forward in the act of braking a car, the industry has resorted to wheel cylinders which can be actuated from either of the two hydraulic sub-systems. The disc brake caliper assembly as described in the aforesaid patents are of this type.

In the manufacture of such devices, a caliper casting is formed having first and second legs joined by a transverse member which when installed spans the disc rotor and disposes the legs on opposite sides of said rotor. The first or inward leg is fabricated to contain the piston assembly which moves a disc brake pad against the inner surface of the disc rotor, and simultaneously moves the entire caliper housing inwardly relative to the disc rotor forcing the second or outer leg of the caliper to carry its associated disc pad also into engagement with the outer surface of the disc rotor. This is the floating caliper type of disc brake.

As will be readily seen from each of these patents, the bore for the cup-shaped piston member in the first leg must be made by passing the boring tool through an accommodating opening in the second or outer leg. This bore has an annular shape rather than a cylindrical shape. The attempt to maintain tolerances with a tool spaced so far from its chucking means is often thwarted. The present invention obviates this difficulty.

Also, as will be seen from each of the foregoing patents, there is provided a dust boot to prevent introduction of foreign matter between the relatively moving metal surfaces of the cup-shaped piston and its annular cylinder walls. The normal assembly procedure is to insert the dust boot into the caliper body and engage it therewith, and then insert the cup-shaped piston through the necked-down inner ring of the dust boot. This procedure, of course, involves stretching the necked-down portion of the dust boot while a considerable length of the cup-shaped piston is being passed therethrough.

According to the present structure, the problem of affixing the dust boot is facilitated.

BRIEF STATEMENT OF THE INVENTION

Briefly stated, therefore, the present invention is in a disc brake caliper assembly. There is provided a caliper body having a first leg adapted to be disposed on one side of the disc rotor and having a flange receiving external face, a second leg adapted to be disposed on the opposite side of the disc rotor, and means joining the first and second legs and adapted to span the disc rotor. A cylindrical bore is provided which extends from side to side of the first leg and is dimensioned to receive a cup-shaped piston for reciprocal movement therein. The cup-shaped piston is provided with a first piston head and an annular piston skirt, the piston being internally bored as a cylinder closed at one end and adapted to receive a second piston for reciprocal movement relative to the first piston. The second piston is a flanged piston and has a piston head at its inner end and defines with the closed cylinder end within the cup-shaped piston, a first fluid chamber. An external flange is provided at the opposite end thereof, and an annular shoulder is formed intermediate these ends and dimensioned to fit within said cylindrical bore. The annular face of the shoulder portion and the end of the annular piston skirt forms a second fluid chamber. Means are then provided for removably fastening the external flange of the second piston to the flange receiving external face of the first leg. Fluid passage means are provided for conducting pressurized fluid to and from the first fluid chamber, and separate fluid passage means are provided for conducting pressurized fluid to and from the second fluid chamber. In preferred embodiments of this invention, bleed passages are provided from high points in each of the fluid chambers and include selectively externally operable valve means for maintaining the passage normally closed.

By dimensioning the parts so that the cross-sectional area of the annular piston skirt is equal to the cross-sectional area of the second piston head, 50 percent of the braking force is applied through the annular piston chamber, and fifty percent of the braking force is applied through the first fluid chamber between the head of the second piston and the inside of the cup-shaped piston member. These chambers are independently connected to the first and second hydraulic sub-systems and their respective fluid pumps in the master cylinder.

BRIEF DESCRIPTION OF THE DRAWINGS

The foregoing invention may be better understood by having reference to the annexed drawings wherein:

FIG. 1 is a diagrammatic representation of a fully redundant dual 4+4 hydraulic brake system for automotive vehicles and showing in cross-section, two side-by-side master cylinders.

FIG. 2 is a cross-sectional view of a disc brake caliper assembly in accordance with the present invention and showing the flanged second piston secured to the first leg or inner leg of a disc brake caliper of the floating caliper type.

FIG. 3 is a fragmentary cross-section of the device shown in FIG. 2 as it appears in the plane indicated by the line 3—3.

DETAILED DESCRIPTION OF THE DRAWINGS

Referring now more particularly to FIG. 1, there is here represented a dual 4+4 hydraulic braking system for an automotive vehicle. A master cylinder 10 is provided having fluid pressurizing pistons 12 and 14 mounted in side-by-side relation which I prefer for reasons such as stated in my prior U.S. Pat. Nos. 3,336,597; 3,370,427; 3,406,522; and 3,530,670. As will be seen from FIG. 1, the fluid pressurizing pistons service completely isolated and fully redundant 4+4 hydraulic sub-systems A and B. Each of the four wheel cylinder assemblies (not shown) receives pressurized hydraulic fluid from two separate sources. Thus, if one of the hydraulic systems A or B each serving all four brakes does fail, there remains intact a second hydraulic sub-system serving all four brakes. In a 4+4 side-by-side system, the pressure in the remaining system is effectively doubled and when working against one-half of the wheel cylinder area, the net effect is that the same braking force is applied at all four of the operative wheel cylinders with no loss of traction as there would be in a conventional 2+2 system with one sub-system failed.

The dotted boxes 16 and 18 diagrammatically represent proportioning valves. Such proportioning valves are commonly used where mixed braking systems are employed. Thus, a common mixed arrangement in current use is the provision of disc brakes in the front and drum brakes in the rear. When disc brakes are used for all four wheels, no proportioning means are necessary, and different displacements may be brought about by changing the relative diameters of the wheel cylinders; the smaller being in the rear and the larger in front. Likewise, when drum brakes are used for all four wheels, proportioning means are not necessary. However, when there is a mixed situation of discs and drum brakes, because of the difference in the way these braking systems operate, proportioning devices are preferred.

Referring now more particularly to FIGS. 2 and 3, there is here shown a floating caliper assembly 20 of the disc type. The caliper 20 is provided with a first leg portion 22 adapted to be disposed on one side of a disc rotor 24 and a second leg portion 26 adapted to be disposed on the opposite side of the disc rotor 24. A member 28 is provided joining the members 22 and 26 and spanning the rotor 24 and the pads 30 and 32.

In the modification of the disc caliper assembly in accordance with the present invention, there is provided a cylindrical bore 34 which extends from the innermost side 36 of the first leg all the way through the leg 22 to the opposite side 38. The side 36 of the leg 22 is desirably machined as a flange receiving surface 36.

A cup-shaped piston 40 is provided for reciprocal movement within the bore 34. The piston head 42 is adapted for abutting relation with the disc brake pad 30. A circumferential recess 44 is provided around the piston head 42 to receive and retain one marginal edge of a flexible rubber dust boot 46. The cup shape of the piston 40 is provided by an internal cylindrical bore 48 extending only partly through the piston 40, the bore 48 closed at the end 50 by the underside of the piston head 42. The bore 48 therefore provides the piston 40 with a piston skirt portion 52.

For coaction in the smaller cylindrical bore 48, there is provided a second piston 54 having a piston head 56 at one end thereof and a flange 58 at the other end thereof. Intermediate the head 56 and the flange 58, there is provided an annular shoulder 60 having an annular face 62. The end 64 of the piston skirt 52 in combination with the face 62 of the shoulder 60 defines an annular pressurized fluid receiving chamber 66 therebetween. In like manner, the inner surface 50 of the piston head 42 in combination with the piston head surface 56 defines a circular fluid pressure receiving chamber 68. In a preferred embodiment, the surface area of the piston head 56 is equal to the surface area of the annular face 62 so that each of these areas provides 50 percent of the total braking force. The cup-shaped piston 40 is suitably sealed with respect to its relatively moving surfaces by sealing rings 68 and 70.

The flanged second piston 54 is removably secured to the flange receiving surface 36 by bolts 72 extending through the flange 58 and into the first leg 22 of the caliper 20. Assembly seal gasket o-ring 74 is provided between leg castings 22 and 26. Any gasket means may be provided for this purpose.

In order to transmit pressurized fluid to and from the chamber 68, there is provided a fluid passage 76 in the piston 54 which, in the embodiment shown, exits through the flange portion 58 where it is suitably tapped as at 78 to receive the standard hydraulic fitting. In like manner, there is provided fluid passage 80 through the leg portion 22, also suitably tapped as at 82 and communicating at its inner end with the annular chamber 66.

In order to exhaust entrapped air from the fluid chambers 66 and 68, conventional bleeder valves may be provided. Thus, there is provided for bleeding the chamber 66, a bleeder valve 84 threadedly engaged in a bore 86 through the side wall of the leg portion 22 and communicating by means of passageway 88 with the fluid chamber 66. A conically shaped valve portion 90 coacts with a valve seat 92 to seal the chamber 66 during normal operation. An escape channel 93 is drilled in a known manner through the central portion of the valve 84 to permit the escape of entrapped gas when the valve is unseated.

Thus, the bleeder valve 84 may be opened by counter-clockwise rotation, and closed to its normally closed position by clockwise rotation until the valve 90 is seated on the valve seat 92. The passageway 88 exits from the chamber 66 at an uppermost point to facilitate exhausting of all entrapped gas. To bleed the chamber 68 there is provided in the piston body 54 a bleeder passageway 94 normally closed with a suitable bleeder valve 96 of similar design and operation to the bleeder valve 84. The bleeder valve 96 is conveniently disposed in a recess 98 in the outer face of the piston 54 for easy access and location in a protected place. The bleeder passage 94 as will be seen in FIG. 2 also communicates with the fluid chamber 68 at an uppermost point 100 to facilitate complete removal of entrapped air.

In order to ensure that the bleeder passageway 94 is not installed upside down in the cup-shaped piston 40, the bolt receiving holes 102 in the flange 58 (FIG. 3) may be unevenly spaced so that they can be assembled in only one way to accommodate right and left wheel caliper assemblies.

It will be observed, therefore, from the structure of the present invention that the cylindrical bore 34 may be made with a drill instead of a boring tool, and need not pass through the leg 26 as with conventional devices. Thus, control of the bore 34 within tolerances is much more easily attained. Likewise, in the fabrication of the piston 54, tolerances are more easily maintained than is the case with a boring tool extending through the opposite leg 26 as with conventional devices. Moreover, the assembly of the dust boot within the leg portion 22, and its subsequent assembly with the piston 40 is greatly facilitated since the skirt portion 52 does not have to pass entirely through the smaller diameter of the dust boot, and only the head portion 42 must do so. The cup-shaped piston 40, therefore, is inserted into the device from the left-hand side as shown in FIG. 2, rather than from the right-hand side as is necessary with conventional devices. Following the installation of the sealing rings 68 and 70, the dust boot 46 and the piston 40, the gasket member 74 is put in place and the flanged piston 54 inserted in place within the cup-shaped piston 40, and the bolts 72 properly torqued down. Accordingly, the problems of fabrication and assembly encountered with prior devices are obviated.

What is claimed is:
1. A disc brake caliper assembly comprising:
   a. a caliper body having
      1. a first leg adapted to be disposed on one side of a disc rotor, and having a flange receiving external face
      2. a second leg adapted to be disposed on the opposite side of said disc rotor
      3. means joining said first and second legs and adapted to span said disc rotor,
   b. a cylindrical bore of constant diameter extending from side to side of said first leg and dimensioned to receive a cup-shaped piston for reciprocal movement therein;
   c. said cup-shaped piston having a first piston head and an annular piston skirt, said cup-shaped piston being internally bored as cylinder closed at one end and adapted to receive a second piston for reciprocal movement between said pistons:
   d. said second piston having a piston head at an external flange extending radially therefrom at its outer end and its inner end, said piston head of said second piston and said closed cylinder end of said cup-shaped piston defining a first fluid chamber, and an annular shoulder intermediate said ends of said second piston being dimensioned to fit within said cylindrical bore and defining with said annular piston skirt a second fluid chamber;
   e. said second piston being removably secured to said first leg of said caliper body by fastening means extending between said external flange and said flange receiving external face;
   f. fluid passage means for conducting pressurized fluid to and from said first fluid chamber, and;
   g. separate fluid passage means for conducting pressurized fluid to and from said second fluid chamber.

2. A disc brake caliper assembly in accordance with claim 1 wherein said second piston includes a bleed passage extending from an outer periphery of said second piston head in said first fluid chamber, through said second piston to an external surface of said second piston, and selectively externally operable valve means for maintaining said passage normally closed.

3. A disc brake caliper assembly in accordance with claim 2 wherein said bleed passage exits the outer periphery of said second piston at a high point in said internally bored cylinder when said caliper is installed.

4. A disc brake caliper assembly in accordance with claim 1 wherein said caliper body includes a separate bleed passage extending from said second fluid chamber to an external surface of said body, and selectively externally operable valve means for maintaining said passage normally closed.

5. A disc brake caliper assembly in accordance with claim 1 wherein cross-sectional area of said annular piston skirt is equal to the cross-sectional area of said second piston head.

6. A disc brake caliper assembly in accordance with claim 1 additionally including a flexible dust boot co-acting between said cup-shaped piston and said caliper body to protect the relatively moving surfaces of said cup-shaped piston and said cylindrical bore through said first leg from foreign matter.

7. A disc brake caliper assembly in accordance with claim 1 including flexible sealing means coacting between said flange and said flange receiving external face.

* * * * *

UNITED STATES PATENT AND TRADEMARK OFFICE
CERTIFICATE OF CORRECTION

PATENT NO. : 4,024,932
DATED : May 24, 1977
INVENTOR(S) : Clarence C. Fay

It is certified that error appears in the above-identified patent and that said Letters Patent are hereby corrected as shown below:

Column 5, line 38 after "having" insert --an external flange extending radially therefrom at its outer end and--

Column 5, line 38 after "at" delete --an external flange extending radially therefrom at its outer end and--.

Signed and Sealed this sixteenth Day of August 1977

[SEAL]

Attest:

RUTH C. MASON
Attesting Officer

C. MARSHALL DANN
Commissioner of Patents and Trademarks